(12) United States Patent
Lee

(10) Patent No.: US 8,787,192 B2
(45) Date of Patent: Jul. 22, 2014

(54) METHOD AND APPARATUS FOR PROCESSING DATA BETWEEN DIFFERENT LAYERS OF MOBILE STATION IN A WIRELESS COMMUNICATION SYSTEM

(75) Inventor: Ki Dong Lee, San Diego, CA (US)

(73) Assignee: LG Electronics Inc., Seoul (KR)

( * ) Notice: Subject to any disclaimer, the term of this patent is extended or adjusted under 35 U.S.C. 154(b) by 102 days.

(21) Appl. No.: 13/467,790

(22) Filed: May 9, 2012

(65) Prior Publication Data

US 2012/0287851 A1 Nov. 15, 2012

Related U.S. Application Data

(60) Provisional application No. 61/484,604, filed on May 10, 2011.

(30) Foreign Application Priority Data

May 8, 2012 (WO) ................ PCT/KR2012/003579

(51) Int. Cl.
*H04J 1/16* (2006.01)

(52) U.S. Cl.
USPC ............................ 370/252; 370/230; 370/328

(58) Field of Classification Search
USPC ......... 370/229, 230, 235, 236, 252, 310, 328, 370/330, 436, 468
See application file for complete search history.

(56) References Cited

U.S. PATENT DOCUMENTS

| 8,582,631 | B2 * | 11/2013 | Vos et al. | 375/224 |
|---|---|---|---|---|
| 2011/0002262 | A1 * | 1/2011 | Wang et al. | 370/328 |
| 2011/0274040 | A1 * | 11/2011 | Pani et al. | 370/328 |
| 2012/0033613 | A1 * | 2/2012 | Lin et al. | 370/328 |
| 2012/0269122 | A1 * | 10/2012 | Lee | 370/328 |
| 2012/0275429 | A1 * | 11/2012 | Chin et al. | 370/331 |

OTHER PUBLICATIONS

"3rd Generation Partnership Project; Technical Specification Group Core Network and Terminals; Mobile radio interface Layer 3 specification; Core network protocols; Stage 3 (Release 9)," Sections 4.7.3.1.5, 4.7.5.1.5 and 4.7.13.5 of 3GPP TS 24.008 V9.5.0 (Dec. 2010)

"3rd Generation Partnership Project; Technical Specification Group Core Network and Terminals; Non-Access-Stratum (NAS) protocol for Evolved Packet System (EPS); Stage 3 (Release 9)," Sections 5.5.1.2.6, 5.5.3.2.6 and 5.6.1.6 of 3GPP TS 24.301 V9.5.0 (Dec. 2010).

"3rd Generation Partnership Project; Technical Specification Group Radio Access Network; Evolved Universal Terrestrial Radio Access (E-UTRA); Radio Resource Control (RRC); Protocol specification (Release 9)," Sections 5.3.3.8, 5.3.8.3, and 6.2.2 of 3GPP TS 36.331 V9.5.0 (Dec. 2010).

(Continued)

*Primary Examiner* — Kwang B Yao
*Assistant Examiner* — Nguyen Ngo
(74) *Attorney, Agent, or Firm* — Birch, Stewart, Kolasch & Birch, LLP

(57) ABSTRACT

A method and user equipment (UE) for communicating data between a serving layer and a served layer are provided. In one design, a serving layer adjusts the value for the served layer before it forwards the value to the served layer. In another design, The serving layer forwards the value to the served layer without adjusting but the served layer adjusts the received value. A predefined mapping rule can be further applied when adjusting the value between two layers.

13 Claims, 11 Drawing Sheets

(56) References Cited

OTHER PUBLICATIONS

Ericsson et al., "Mobililty Management Congestion Control and Back-Off Timer," Change Request, 3GPP TSG-CT WG1 Meeting # 70, C1-110788, Feb. 21-25, 2011, Salt Lake City, Utah, 41 pages.
Ericsson et al., "Mobililty Management Congestion Control and Back-Off Timer," Change Request, 3GPP TSG-CT WG1 Meeting #70, C1-110788, Feb. 21-25, 2011, Salt Lake City, Utah, 41 pages.
Ericsson et al., "Mobility Management Congestion Control and Back-Off Timer," Change Request, 3GPP TSG-CT WG 1 Meeting #69, C1-110471, Jan. 24-28, 2011, Ljubljana, Slovenia, 40 pages.
Ericsson, "Updated Value Range for the Extended Wait Timer," Change Request, 3GPP TSG-RAN2 Meeting #73bis, R2-112256, Apr. 11-15, 2011, Shanghai, China, 7 pages.
NTTDoCoMo, Consideration on UE Behavior Upon Receiving Paging Request from NW While MM/SM Back-Off Timer is Running in UE Side, 3GPP TSG CT WG1 Meeting #70, C1-110797, Feb. 21-25, 2011, Salt Lake City, Utah, 8 pages.

\* cited by examiner

METHOD AND APPARATUS FOR PROCESSING DATA BETWEEN DIFFERENT LAYERS OF MOBILE STATION IN A WIRELESS COMMUNICATION SYSTEM

CROSS-REFERENCE TO RELATED APPLICATIONS

The present application for patent claims priority to Provisional Application No. 61/484,604 filed on May 10, 2011, and International Application No. PCT/KR2012/003579 filed on May 8, 2012, which are incorporated by reference in its entirety herein.

BACKGROUND OF THE INVENTION

1. Field of the Invention

The technical features of this document relate to wireless communications using a number of orthogonal frequency division multiple (OFDM) symbols, and more particularly, to a method and apparatus for processing data in a protocol stack comprising a number of layers, such as a radio resource control (RRC) and a non-access stratum (NAS).

2. Related Art

The Third Generation Partnership Project (3GPP) Long Term Evolution (LTE) which is a set of enhancements to the Universal Mobile Telecommunications System (UMTS) is introduced as 3GPP Release 8. The 3GPP LTE uses orthogonal frequency division multiple access (OFDMA) for a downlink, and uses single carrier frequency division multiple access (SC-FDMA) for an uplink, and adopts multiple input multiple output (MIMO) with up to four antennas. In recent years, there is an ongoing discussion on 3GPP LTE-Advanced (LTE-A), which is a major enhancement to the 3GPP LTE.

Machine to machine (M2M) communication is the communication between machines that do not necessarily need human intervention. The 3GPP has started an effort to determine potential network optimizations that could lower the operational costs associated with offering these new M2M services.

SUMMARY OF THE INVENTION

The technical features of this document provide a method of communicating data between a radio resource control (RRC) of a user equipment (UE) and a non-access stratum (NAS) of the UE. The method is applicable to the UE in wireless communication system using a number of orthogonal frequency division multiplexing (OFDM) symbols.

In one aspect, the method comprises receiving, by the RRC of the UE, an RRC message including a first time value for an extended wait time from a base station; adjusting, by the RRC of the UE, the first time value to a second time value when the first time value does not fall within a range of a time value for a mobility management (MM) back-off timer, wherein the second time value falls within the range of the time value for the MM back-off timer; and forwarding, by RRC of the UE, the second time value to the NAS of the UE for enabling the NAS of the UE to apply the second time value to the MM back-off timer.

In the method, the RRC message can be one of an RRC connection reject message and an RRC connection release message.

In the method, the UE can support a delay tolerant access or a low priority access.

The method can further comprise starting an extended wait timer based on the first time value; and performing an access class (AC) barring procedure after the extended wait timer is expired.

In the method, the step of adjusting can be performed based on a predetermined mapping rule.

In the method, the first time value ranges from a first lower bound to a first upper bound, and the second time value ranges from a second lower bound to a second upper bound, wherein the adjustment from the first time value from the second time value can be performed based on a predetermined mapping rule.

In the method, the first upper bound is identical to the second upper bound, and the first lower bound is less than the second lower bound, wherein the adjusted second time value is identical to the first time value if the first time value is not less than the second lower bound, wherein the first time value is adjusted to be identical to the second lower bound if the first time value is less than the second lower bound.

In another aspect, the method comprises receiving, by the RRC of the UE, an RRC message including a first time value for an extended wait time from a base station; forwarding, by RRC of the UE, the first time value to the NAS of the UE; adjusting, by the NAS of the UE, the first time value to a second time value when the first time value does not fall within a range of a time value for a mobility management (MM) back-off timer, wherein the second time value falls within the range of the time value for the MM back-off timer; and starting an MM back-off timer according to the second time value.

In another aspect, a user equipment (UE) for communicating data with a base station by using a number of orthogonal frequency division multiplexing (OFDM) symbols is further provided. The UE comprises a processor including a radio resource control (RRC) and a non-access stratum (NAS), wherein the RRC is configured for receiving an RRC message including a first time value for an extended wait time from the base station, adjusting the first time value to a second time value when the first time value does not fall within a range of a time value for a mobility management (MM) back-off timer, wherein the second time value falls within the range of the time value for the MM back-off timer, and forwarding the second time value to the NAS for enabling the NAS to apply the second time value to the MM back-off timer.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). The $3^{rd}$ generation partnership project (3GPP) long term evolution (LTE) is a part of an evolved UMTS (E-UMTS) using the E-UTRA. The 3GPP LTE uses the OFDMA in the downlink and uses the SC-FDMA in the uplink.

For clarity of explanation, the following description will focus on the 3GPP LTE and its evolution. However, the technical features of this description are not limited thereto.

Figure 1:
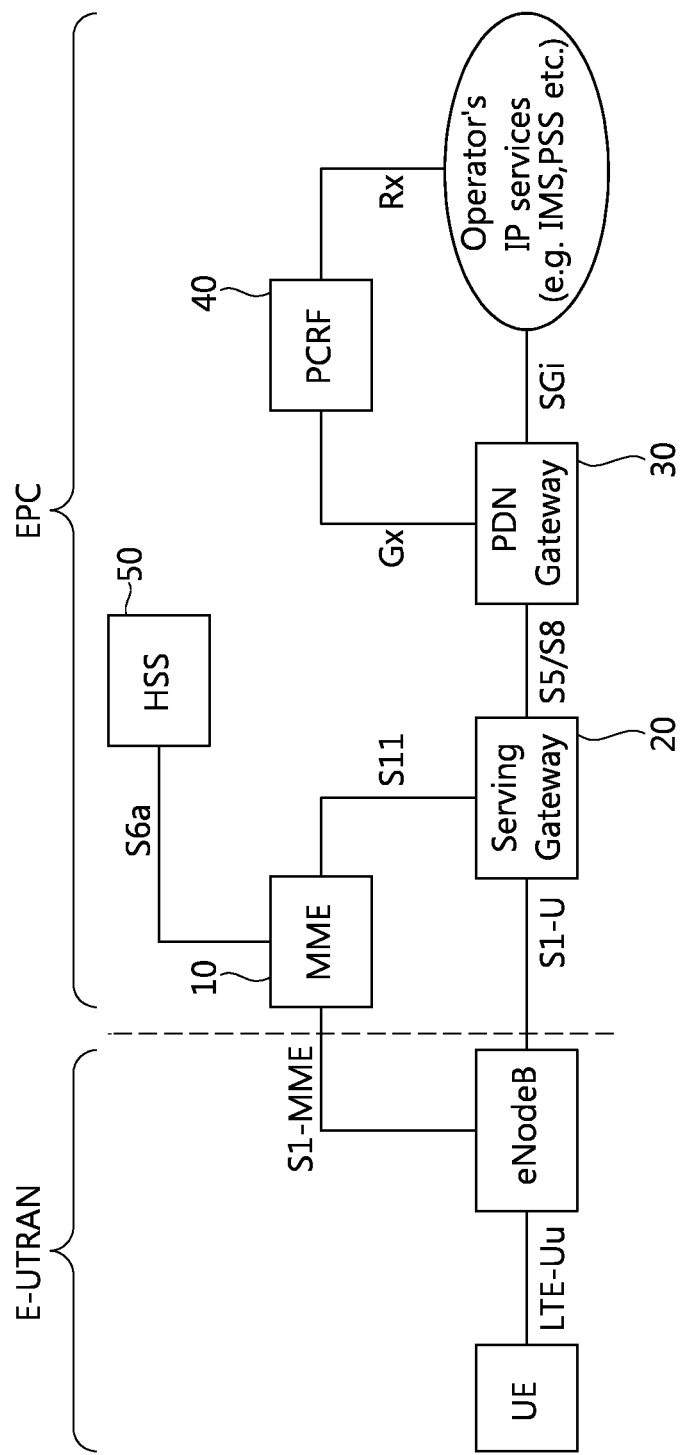
FIG. 1 is a view illustrating an Evolved Packet System which is associated with the Long Term Evolution (LTE) system.

FIG. 1 is a view illustrating an Evolved Packet System which is associated with the Long Term Evolution (LTE) system. The LTE system aims to provide seamless Internet Protocol (IP) connectivity between a user equipment (UE) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of "EPS bearers" to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers. As depicted in FIG. 1, the node (logical or physical) of the EPC in the SAE includes a Mobility Management Entity (MME) 10, a PDN gateway (PDN-GW or P-GW) 30, a Serving Gateway (S-GW) 20, a Policy and Charging Rules Function (PCRF) 40, a Home subscriber Server (HSS) 50, etc.

The MME 10 is the control node which processes the signaling between the UE and the CN. The protocols running between the UE and the CN are known as the Non-Access Stratum (NAS) protocols. Examples of functions supported by the MME 10 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 20 serves as the local mobility anchor for the data bearers when the UE moves between eNodeBs. All user IP packets are transferred through the S-GW 20. The S-GW 20 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 30 serves to perform IP address allocation for the UE, as well as QoS enforcement and flow-based charging according to rules from the PCRF 40. The P-GW 30 performs QoS enforcement for Guaranteed Bit Rate (GBR) bearers. It also serves as the mobility anchor for inter-working with non-3GPP technologies such as CDMA2000 and WiMAX networks.

The PCRF 40 serves to perform policy control decision-making, as well as for controlling the flow-based charging functionalities.

The HSS 50, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, Sha, Gx, Rx and SGi are defined.

Hereinafter, the concept of mobility management (MM) and a mobility management (MM) back-off timer is explained in detail. The mobility management is a procedure to reduce the overhead in the E-UTRAN and processing in the UE. When the mobility management is performed, all UE-related information in the access network can be released during periods of data inactivity. This state can be referred to as EPS Connection Management IDLE (ECM-IDLE). The MME retains the UE context and the information about the established bearers during the idle periods.

To allow the network to contact a UE in the ECM-IDLE, the UE updates the network as to its new location whenever it moves out of its current Tracking Area (TA). This procedure is called a 'Tracking Area Update', and a similar procedure is also defined in a universal terrestrial radio access network (UTRAN) or GSM EDGE Radio Access Network (GERAN) system and is called a 'Routing Area Update'. The MME serves to keep track of the user location while the UE is in the ECM-IDLE state.

When there is a need to deliver downlink data to the UE in the ECM-IDLE state, the MME transmits the paging message to all base stations (i.e., eNodeBs) in its current tracking area (TA). Thereafter, eNBs start to page the UE over the radio interface. On receipt of a paging message, the UE performs a certain procedure which results in changing the UE to ECM-CONNECTED state. This procedure is called a 'Service Request Procedure'. UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer can be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

Figure 2:
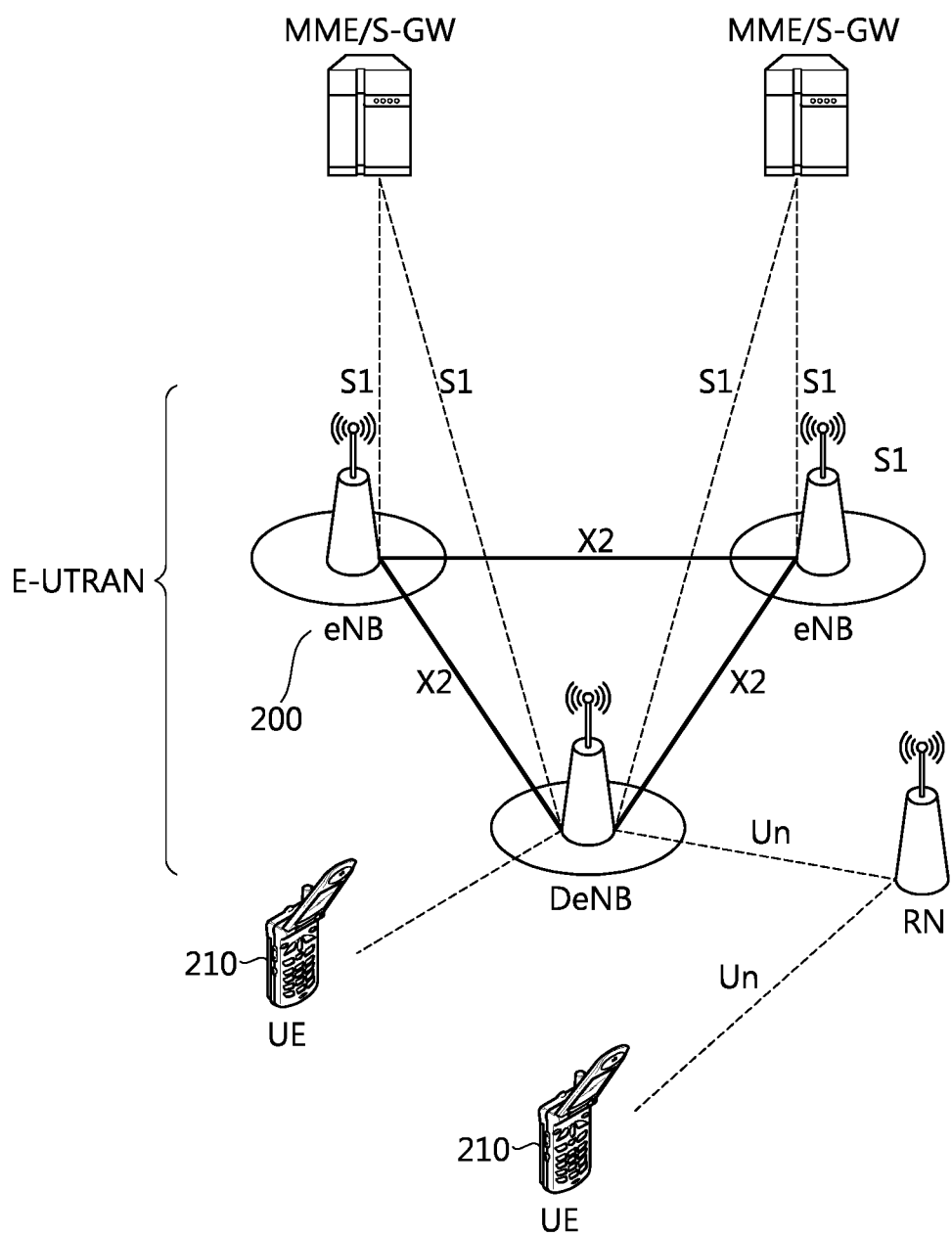
FIG. 2 is a view illustrating an overall architecture of the E-UTRAN to which the following technical features are applied.

FIG. 2 is a view illustrating an overall architecture of the E-UTRAN to which the following technical features are applied.

The E-UTRAN includes at least one eNB (evolved-Node B) 200 providing a user plane and a control plane towards a user equipment (UE) 210. The UE can be fixed or mobile and can be referred to as another terminology, such as a MS (Mobile Station), a UT (User Terminal), an SS (Subscriber Station), an MT (mobile terminal), a wireless device, or the like. The eNB 200 may be a fixed station that communicates with the UE 100 and can be referred to as another terminology, such as a base station (BS), a NB (NodeB), a BTS (Base Transceiver System), an access point, or the like.

The protocols running between the eNBs 200 and the UE 210 are known as the Access Stratum (AS) protocols.

The BSs (or eNBs) 200 are interconnected with each other by means of an X2 interface. The BSs 200 are also connected by means of the S1 interface to the aforementioned EPC (Evolved Packet Core) elements, more specifically to the Mobility Management Entity (MME) by means of the S1-MME and to the Serving Gateway (S-GW) by means of the S1-U.

Further, the E-UTRAN can additionally provide relay functionality. The E-UTRAN can include a Donor eNB (DeNB) that provides at least one Relay Node (RN), with access to the core network. Between the DeNB and RN, a Un interface is defined, whereas a Uu interface is further defined between the RN and the UE.

As discussed above, the machine to machine (M2M) communication is the communication between machines that do not necessarily need human intervention, and the 3GPP has started an effort to determine potential network optimizations. The M2M communication, which is also referred to as machine type communication (MTC), is expected to have applications in areas, such as smart metering, home automation, e-Health, fleet management, etc.

M2M communications have a number of unique characteristics which may be used to optimize the usage of the operator network. These characteristics include, for example: mostly data-centric communication (voice not expected), a potentially large number of communicating terminals, a low traffic volume per terminal, a potentially low mobility for some devices, and potentially power-limited devices.

Hereinafter, the concept of wait time and extended wait time is explained in detail.

The wait time and extended wait time are related to a random access procedure and an access class barring. In particular, the random access procedure can be initiated with an Access Class (AC) barring. In 3GPP, each UE belongs to an AC in the range 0-9. In addition, some UEs may belong to one or more high priority ACs in the range 11-15, which are reserved for specific uses, e.g., security services, public utilities, PLMN staff, etc. AC 10 is used for emergency access.

The UE checks if access is barred for all its applicable ACs, and relevant control information is transmitted via SystemInformationBlockType2 (SIB 2). SIB 2 may include a set of AC barring parameter for Mobile Originated (MO) calls and/or MO signaling. This set of parameters comprises a probability factor and a barring timer for ACs 0-9 and a list of barring bits for ACs 11-15. For ACs 0-9, if the UE initiates an MO call and the relevant parameters are included, the UE draws a random number. If the drawn number exceeds the probability factor, access is not barred. Otherwise access is barred for a duration which is randomly selected based on the broadcasted barring time value. For ACs 11-15, if the UE initiates an MO call and the relevant AC barring parameters are included, access is barred whenever the bit corresponding to all of the UE's AC is set. The behavior is similar in the case of UE-initiated MO signaling.

Figure 3:
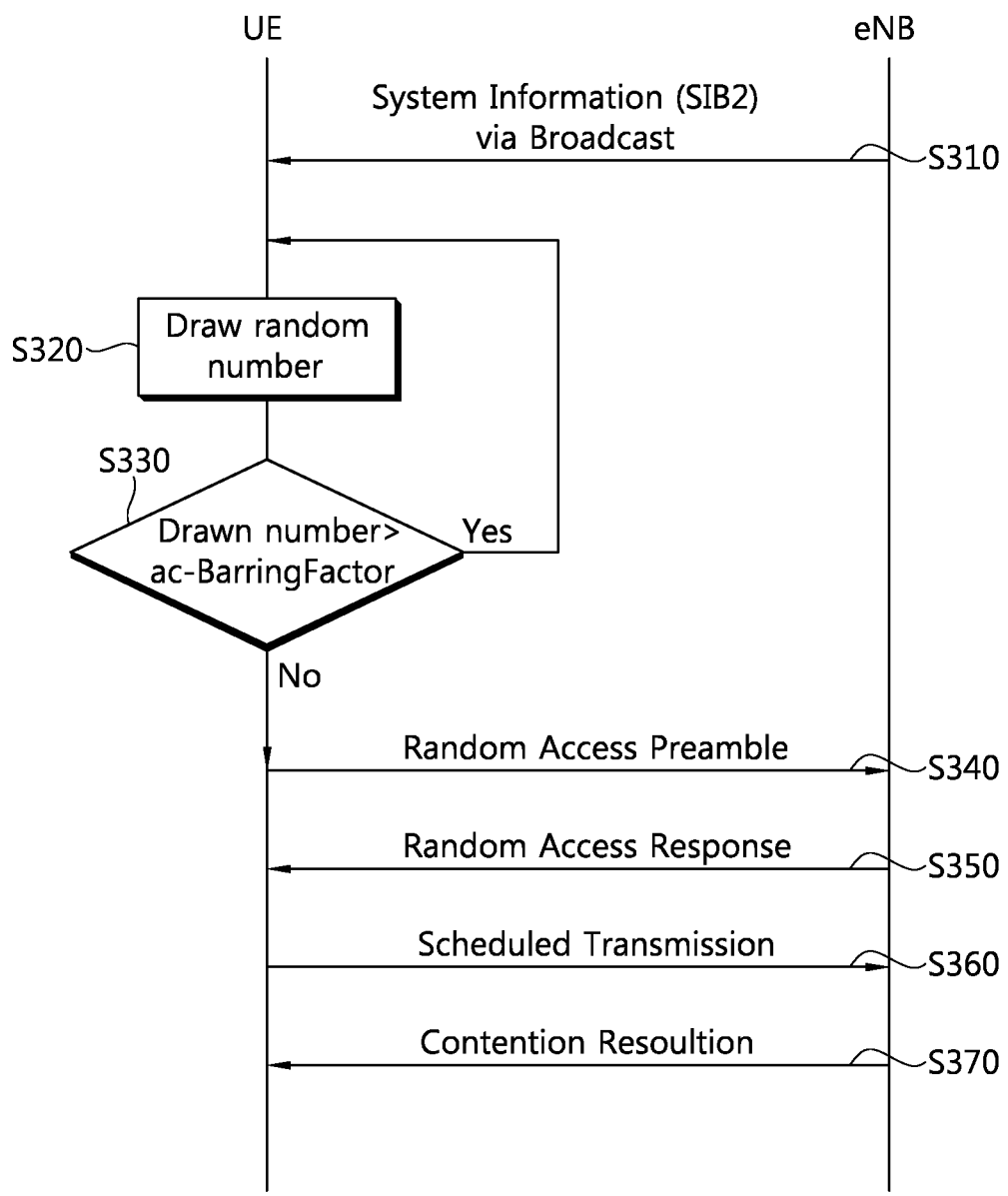
FIG. 3 is a flow diagram showing a random access procedure according to an embodiment of the proposed method.

FIG. 3 is a flow diagram showing a random access procedure according to an embodiment of the proposed method.

In order to obtain new connection (e.g., a data connection or signaling connection) UEs should first perform a RA procedure and this is a common feature in most cellular system. Further, the RA procedure can be categorized into contention-based and contention-free. The example depicted in FIG. 3 is directed to the contention-based RA procedure.

Referring to FIG. 3, in step S310, the relevant parameters are transmitted from a base station (e.g., eNB). Various control information can be broadcasted via 'System information', such as Master Information Block (MIB) and System Information Block type k (k=1, 2, . . . ), and the relevant paragraph associated with the AC barring is broadcasted via SIB 2, as discussed above. As explained above, SIB 2 provides information for UEs how they perform the RA procedure. The SIB 2 further includes a value for 'ac-BarringFactor', which indicates the probability that a certain UE is supposed to be prevented from attempting the RA procedure to a certain cell. In case of an ordinary call (i.e., MO data call), in step S320, the UE shall draw a random number from a uniform distribution (0,1). If the random number drawn is less than the 'ac-BarringFactor', the UE performs subsequent steps of the RA procedure (S330).

Referring to FIG. 3, in step S340, the UE selects a particular random access preamble and certain Random Access Channel (RACH) resources from an available random access preamble set and RACH resources, and transmits the selected random access preamble on the selected RACH to the eNB.

In step S350, the eNB receives the random access preamble, and then transmits a random access response to the UE. The random access response includes a time advance (TA) and uplink radio resource allocation information for the transfer of a scheduled message to be described below. In addition, the random access response includes an index of the received random access response so that the UE can determine whether the random access response is for the UE. The random access response transmitted on a DL-SCH (downlink-shared channel) may be specified by a DL L1/L2 (downlink layer 1/layer 2) control channel indicated by a random access-radio network temporary identity (RA-RNTI).

In step S360, the UE receives the random access response, and then transmits the scheduled message according to the radio resource allocation information included in the random access response. The scheduled message, which is also referred to as a message 3, may include an RRC connection request message.

In step S370, the BS receives the scheduled message from the UE, and then transmits a contention resolution message, which is also referred to as a message 4, to the UE. In order to check whether contention occurs with respect to the message 3, a contention resolution timer is initiated after transmitting the message 3. If the message 4 is not successfully received until the contention resolution timer expires, step 370 may be repeated based on predefined configuration.

After the RRC connection request message is accepted by the network, an RRC connection can be successfully established and the UE enters an RRC connected mode. However, the RRC connection request may be rejected, and the UE may thereafter receive an 'RRCConnectionReject' message from the eNB. Further, the UE may consider that the RRC connection requested is regarded as rejected without explicitly receiving the 'RRCConnectionReject' when the contention resolution timer expires without receiving the message 4. In these cases, the wait time can be applied before performing the AC barring to avoid the large number of UE-initiated call attempts. In particular, the UE is required to avoid a subsequent AC barring during the wait time, which is indicated by the network. In the standard, a range of the wait time is set to [1, 16 (sec)].

In addition, if an 'RRCConnectionRelease' message is received by a UE, the wait time is also applied before performing the AC barring. The RRCConnectionRelease message is received when the RRC Connection is released after the RRC connection is successfully established.

Recently, 3GPP has newly introduced an 'extendedWaitTime', which is an extended version of the above-mentioned wait time. Accordingly, the extended wait time is applicable to a case where a request for RRC connection is regarded as rejected or an RRC connection is released. Meanwhile, the extended wait time can be additionally used with the wait time. Namely, for a certain UE, both the wait time and the extended wait time can be applied.

A range of the extended wait time was originally set to [1, 4096 (sec)], but recently changed to [1, 1800 (sec)]. An exact time value of the extended wait time can be contained in the 'RRCConnectionReject' or 'RRCConnectionRelease' message. Once the extended wait time is contained, the UE reports to the upper layer (i.e., NAS layer), sets the timer (not yet specified) value as the received 'extendedWaitTime', and starts the timer of the extended wait time. While the timer is running, the UE is not allowed to attempt an RRC connection request. The use of 'extendedWaitTime' is to prevent the UE (released or rejected) from attempting 'RRCConnectionRequest' for a longer period of time than the wait time.

The concept of the extended wait time is highly associated with M2M communications, delay tolerant accesses, and/or lower priority accesses. Namely, it is preferred that the extended wait time is applied to a UE, which has M2M, delay tolerant, and/or lower priority characteristics. For instance, if the UE is identified as an M2M (or MTC) devices, and/or a cause code in RRC messages (e.g., RRC connection request/release messages) is identified as 'delay tolerant' or 'lower priority', the extended wait time is applicable. Meanwhile, it is noted that even H2H devices (e.g., human UEs), as opposed to M2M devices, can have the delay tolerant or lower priority characteristics, when a certain connection or an application in the H2H devices has such characteristics.

Hereinafter, a method and apparatus for inter-layer range matching are provided in detail. The following description provides a method and apparatus for matching values provided from a radio resource control (RRC) layer. In particular, the proposed method and apparatus are associated with a Radio Resource Control (RRC) signaling, Random Access (RA) procedure, and extended wait time used during the random access procedure in the wireless communication systems such as 3GPP LTE. Further, the following description is associated with the machine to machine (M2M) communications, low priority accesses and/or delay tolerant accesses.

In the area of mobile communication protocol design, a layered architecture or layer protocol has been used widely. That is, within a pair of devices communicating each other, there are protocol stacks for each party, in which there are multiple layers of protocols designed in the stack. Each layer has input from and output or service to the other layer(s). For example, in 3GPP, a lower layer (e.g., MAC layer) reports information associated with Random Access problem to upper layer (e.g., RRC layer), and the upper layer decides the occurrence of radio link failure (RLF) based on the reported information from the lower layer. Another example may comprise a case where the RRC layer provides information on the wait time or the extended wait time for the NAS layer and the NAS layer will use this information for the MM back-off timer.

However, there is a possible situation in which the serving layer (the layer providing input to another layer) should use its service/output to the same layer of its counterpart (e.g., eNB's RRC layer transmits some input value to the UE's RRC layer) and also this information is necessary for another layer served by this layer of this counterpart. In this situation, a range of the input value of a certain layer may be different from that of another layer as depicted in FIG. 4.

Figure 4:
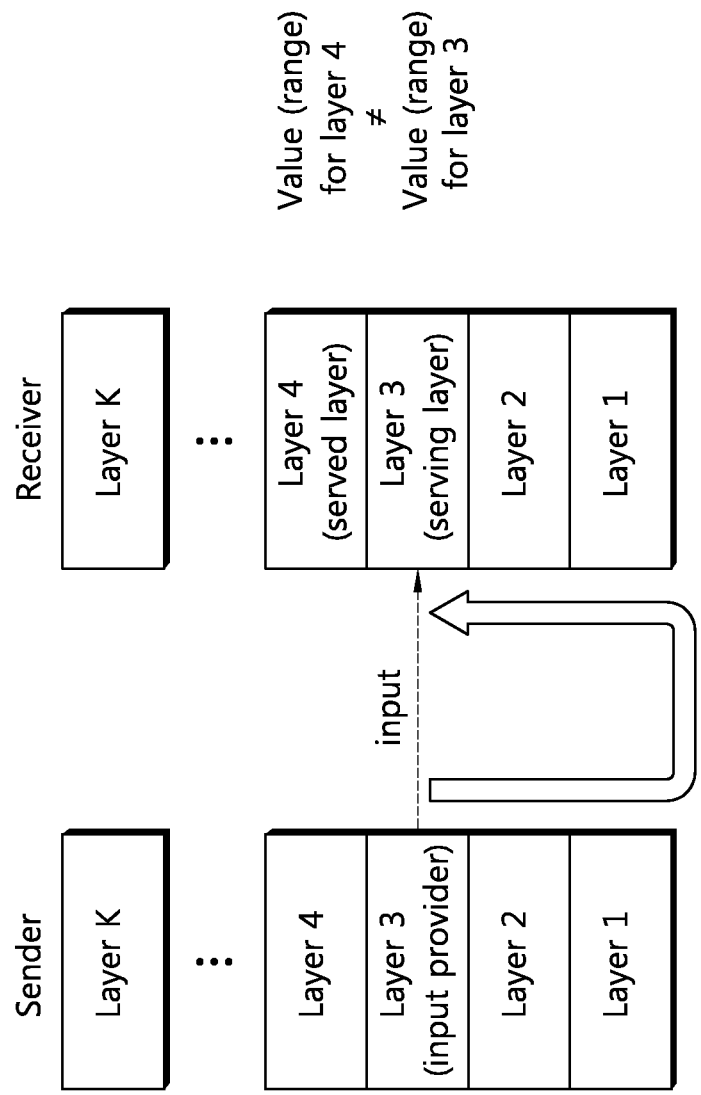
FIG. 4 is a view illustrating an example in which a range of values supported by a serving layer is different from that of a served layer.

FIG. 4 is a view illustrating an example in which a range of values supported by a serving layer is different from that of a served layer. For instance, a transmitter may transmit an integer value '1' (out of [0 . . . 10]) to a layer 3 (e.g., RRC layer); the layer 3 serves to convey the value to a layer 4 (e.g., NAS layer); however, a range of values supported by the layer 4 may be limited to [5 . . . 10]. Namely, the conventional protocol stack may incur an interlayer mismatching problem.

The proposed method and apparatus provide adjusting mechanism to solve the above-mentioned problem. In particular, proposed method and apparatus provide at least two examples, i.e., Method 1 in which the serving layer adjusts the value for the served layer before it forwards the value to the served layer, and Method 2 in which the serving layer forwards the value to the served layer without adjusting but the served layer adjusts the received value.

According to Method 1, the proposed method allows the serving layer (e.g., RRC layer) to adjust a value for the served layer (e.g., NAS layer). In Method 1, the value to be adjusted can be associated with a time value for the extended wait time, which is used by the RRC layer. In particular, the adjusted value to be transmitted to the served layer can be further used for the MM back-off timer, which is used by the NAS layer.

Figure 5:
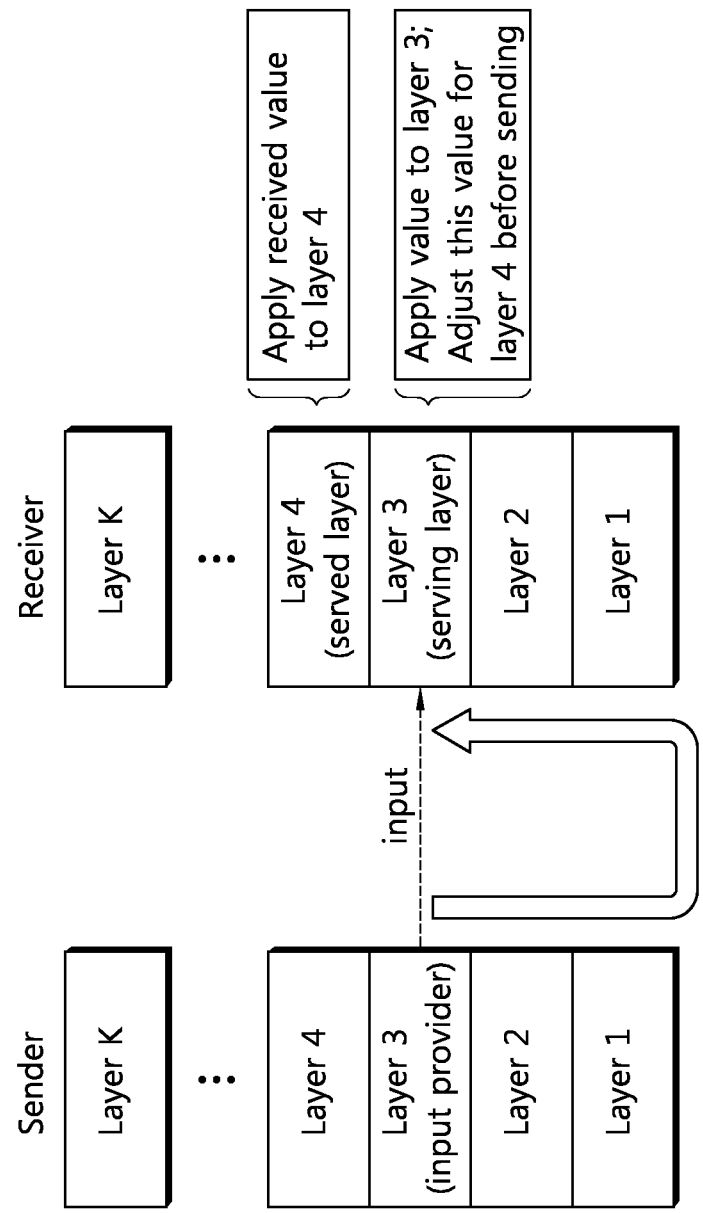
FIG. 5 is a view illustrating a first method of adjusting an original value.

FIG. 5 is a view illustrating a first method of adjusting an original value. Referring to FIG. 5, the RRC layer of the eNB requests lower layers (i.e., layer 1 & layer 2) of the eNB to transmit a message (or packet) to the UE. Lower layers (i.e., layer 1 & layer 2) of the UE receive the message and deliver it to the upper layer (e.g., RRC layer) of the UE. The RRC layer of the UE applies the delivered value when applicable, as defined by the protocol specification or predetermined rule, and thereafter the RRC layer of the UE adjusts the value for another layer (e.g., NAS layer) when there is a range mismatch between the value received in RRC and the value to be used in the NAS layer. It is noted that mismatch between the RRC layer and NAS layer can occur in the protocol specification. If the RRC value falls into the range of the NAS layer, no adjustment is further needed. After the adjustment is performed, the RRC layer of the UE forwards the adjusted value to the NAS layer.

The example depicted in FIG. 5 is shown for exemplary purposes, and features of FIG. 5 can be modified in various manners. For example, the server layer can be a layer 2 and the served layer can be a layer 3.

Figure 6:
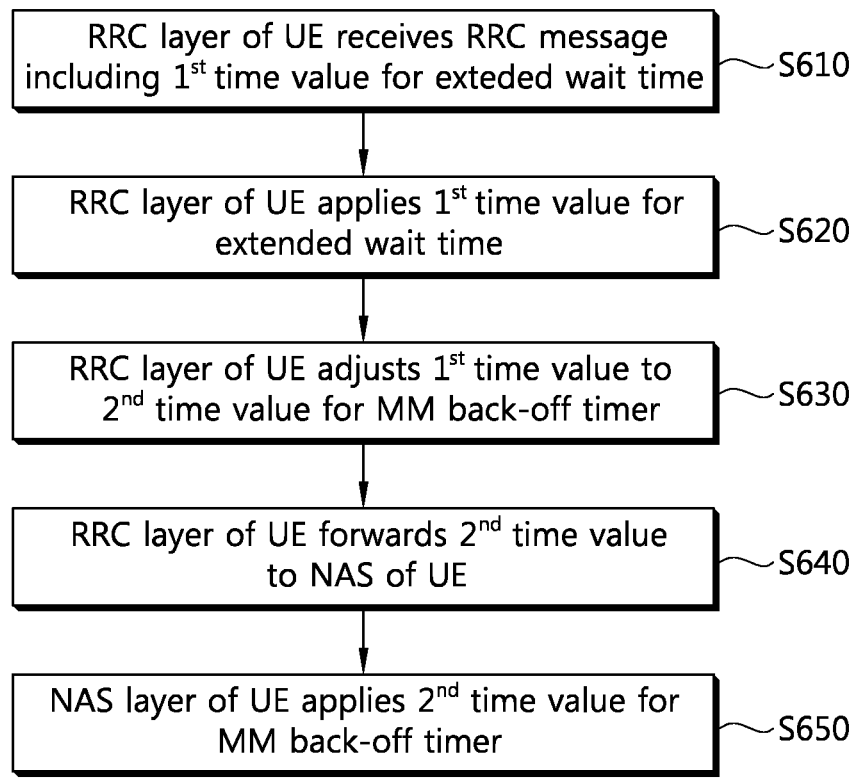
FIG. 6 is a flow diagram showing an embodiment of the proposed method.

As discussed above, the above features are applicable to the RRC layer and the NAS layer of the UE. FIG. 6 is a flow diagram showing an embodiment of the proposed method. Referring to FIG. 6, in step S610, the RRC layer of the UE receives an RRC message (e.g., RRC connection reject/release message) including the $1^{st}$ time value (unadjusted value) for the extended wait time. In step S620, the RRC layer of the UE applies the 1st time value for the extended wait time if the 1$^{st}$ time value falls into a predefined range (e.g., [1, 1800 sec]). In step S630, the RRC layer of the UE adjusts the 1$^{st}$ time value to the 2$^{nd}$ time value (adjusted value) for the MM back-off timer when the 1$^{st}$ time value does not fall within a range of a time value for the MM back-off timer. In step S640, the RRC layer of the UE forwards the 2$^{nd}$ time value to the NAS of the UE. In step S650, the NAS layer of the UE applies the 2$^{nd}$ time value for the MM back-off timer.

Figure 7:
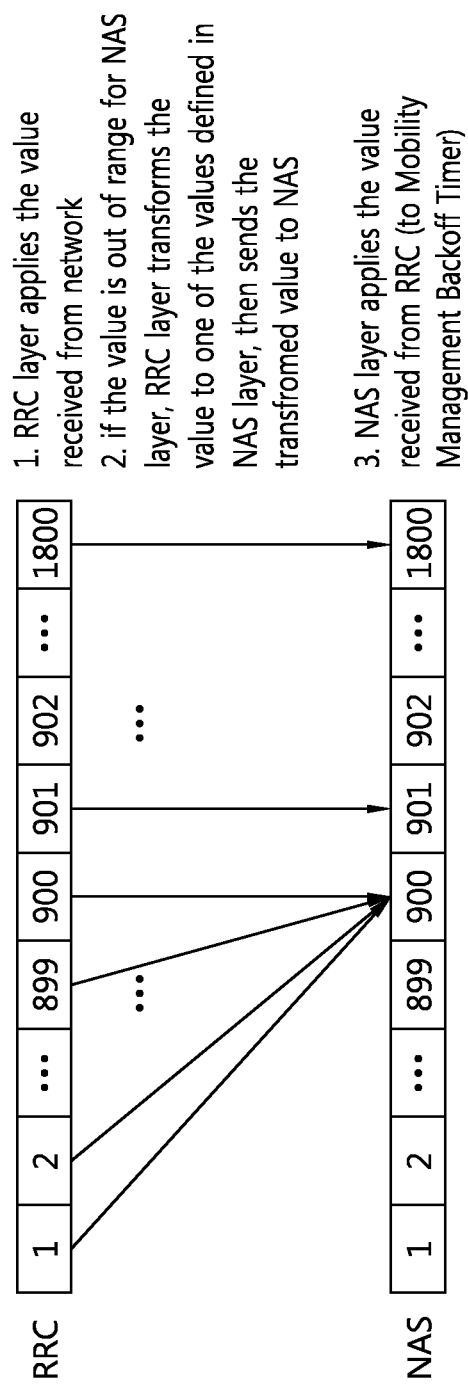
FIG. 7 is a view illustrating a mapping rule for adjusting an original time value.

The information of the extended wait time can be included in the RRC messages, i.e., RRC connection reject/release messages. Related technology of the wait time is disclosed in Sections 5.3.3.8, 5.3.8.3, and 6.2.2 of 3GPP TS 36.331 V9.5.0 (2010-12) "Radio Resource Control (RRC); Protocol specification (Release 9)," which are incorporated by reference in their entirety herein. The above-mentioned example regarding the RRC connection reject message can be explained in the context of parameters used in the Section 5.3.3.8 (i.e., reception of the RRCConnectionReject by the UE) of 3GPP TS 36.331 as follows:

The UE shall:
1> stop timer T300;
1> reset MAC and release the MAC configuration;
1> start timer T302, with the timer value set to the waitTime;
1> if the extendedWaitTime is present and the UE supports delay tolerant access:
2> if the extendedWaitTime value is less than the lower bound of the value for the upper layers to use,
3> adjust the extendedWaitTime value to its predetermined lower bound value;
2> forward the extendedWaitTime to upper layers;
1> inform upper layers about the failure to establish the RRC connection and that access barring for mobile originating calls, mobile originating signalling, mobile terminating access is applicable and mobile originating CS fallback, upon which the procedure ends;

Further, the above-mentioned example regarding the RRC connection release message can be explained in the context of parameters used in the Section 5.3.8.3 (i.e., reception of the RRCConnectionRelease by the UE) of 3GPP TS 36.331 as follows:

The UE shall:
1> delay the following actions defined in this sub-clause 60 ms from the moment the RRCConnectionRelease message was received or optionally when lower layers indicate that the receipt of the RRCConnectionRelease message has been successfully acknowledged, whichever is earlier;
1> if the RRCConnectionRelease message includes the idleModeMobilityControlInfo
2> store the cell reselection priority information provided by the idleModeMobilityControlInfo;
2> if the t320 is included:
3> start timer T320, with the timer value set according to the value of t320;
2> else:
2> apply the cell reselection priority information broadcast in the system information;
1> if the releaseCause received in the RRCConnectionRelease message indicates 'loadBalancingTAURequired':
2> perform the actions upon leaving RRC_CONNECTED as specified in 5.3.12, with release cause 'load balancing TAU required';
1> else if the releaseCause received in the RRCConnectionRelease message indicates 'cs-FallbackHighPriority':
2> perform the actions upon leaving RRC_CONNECTED as specified in 5.3.12, with release cause 'CS Fallback High Priority';
1> else:
2> if the extendedWaitTime is present and the UE supports delay tolerant access:
2> if the extendedWaitTime value is less than the lower bound of the value for the upper layers to use,
3> adjust the extendedWaitTime value to its predetermined lower bound value;
3> forward the extendedWaitTime to upper layers;
2> perform the actions upon leaving RRC_CONNECTED as specified in 5.3.12, with release cause 'other';

The above features allow the RRC of the UE to adjust an original time value used for the extended wait time to an adjusted time value to be used for the MM back-off timer according to the following mapping rule, which is depicted in FIG. 7. FIG. 7 is a view illustrating a mapping rule for adjusting an original time value. According to FIG. 7, the RRC layer which serves the NAS layer transforms (or adjusts) the value if the original time value is out of range defined in NAS layer. The transformation or adjustment is performed after the original time value (for the extended wait time) is applied in the RRC and before the adjusted value is forwarded to the NAS layer.

According to Method 2, the proposed method allows the serving layer to forward the original value to the served layer without adjusting. Further, the proposed method allows the served layer to adjust the original value.

Figure 8:
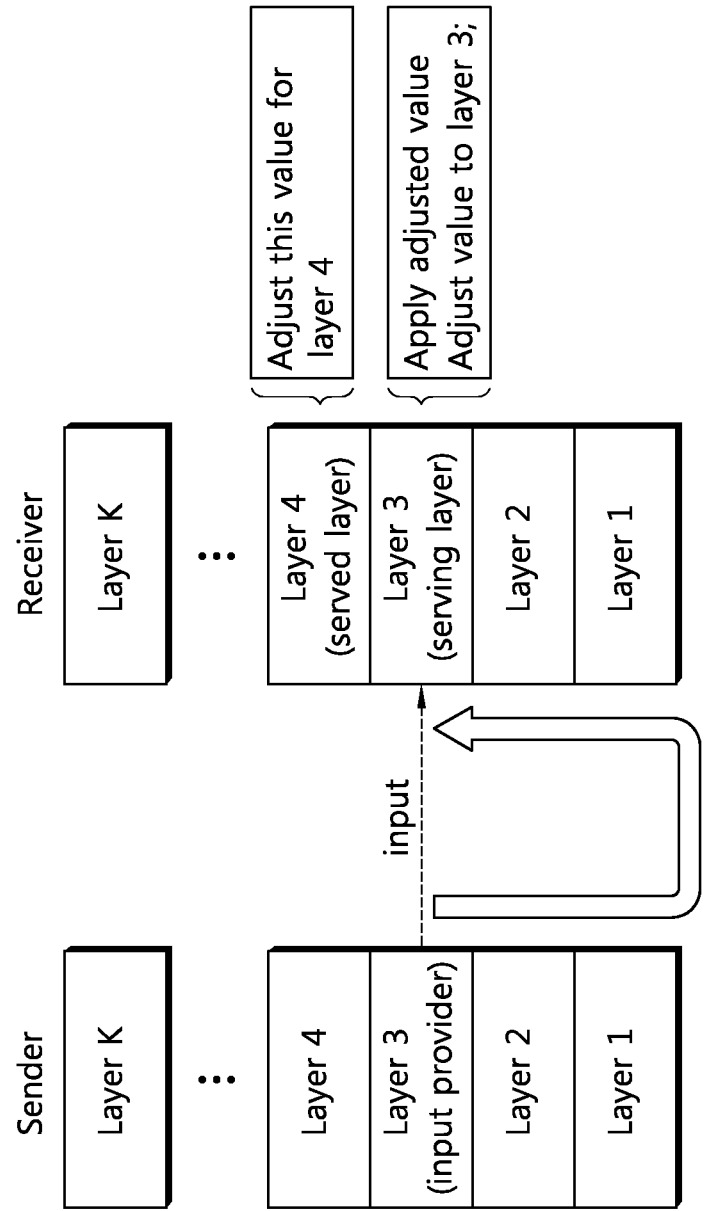
FIG. 8 is a view illustrating a second method of adjusting an original value.

FIG. 8 is a view illustrating a second method of adjusting an original value. Referring to FIG. 8, the RRC layer of the eNB requests the lower layers (i.e., layer 1 & layer 2) of the eNB to transmit a message (or packet) to the UE. Lower layers (i.e., layer 1 & layer 2) of the UE receive the message and deliver it to the upper layer (e.g., RRC layer) of the UE. The RRC layer of the UE applies the delivered value when applicable, as defined by the protocol specification or predetermined rule, and thereafter the RRC layer of the UE forwards the value (or set of information including the value) to another layer (e.g., NAS layer, or MAC layer) without adjustment. The served layer (e.g. NAS layer) adjusts the value for its own use when there is a range mismatch between the received value from the serving layer and the value to be used in the served layer (e.g., NAS layer).

The example depicted in FIG. 8 is shown for exemplary purposes, and features of FIG. 8 can be modified in various manners. For example, the server layer can be a layer 2 and the served layer can be a layer 3.

As discussed above, the above features are applicable to the RRC layer and the NAS layer of the UE.

Figure 9:
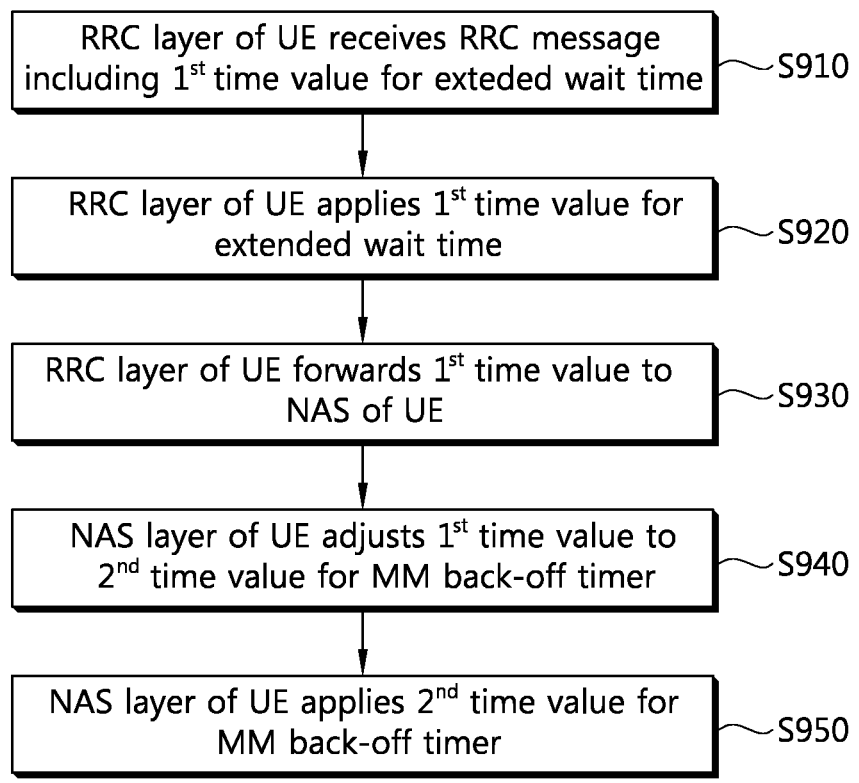
FIG. 9 is a flow diagram showing another embodiment of the proposed method.

FIG. 9 is a flow diagram showing another embodiment of the proposed method. Referring to FIG. 9, in step S910, the RRC layer of the UE receives an RRC message (e.g., RRC connection reject/release message) including the 1$^{st}$ time value (unadjusted value) for the extended wait time. In step S920, the RRC layer of the UE applies the 1$^{st}$ time value for the extended wait time if the 1$^{st}$ time value falls into a predefined range (e.g., [1, 1800 sec]). In step S930, the RRC layer of the UE forwards the 1$^{st}$ time value to the NAS of the UE. In step S940, the NAS layer of the UE adjusts the 1$^{st}$ time value to the 2$^{nd}$ time value (adjusted value) for the MM back-off timer when the 1$^{st}$ time value does not fall within a range of a time value for the MM back-off timer (e.g., [900, 1800 sec]). In step S950, the NAS layer of the UE applies the 2$^{nd}$ time value for the MM back-off timer.

Related operations performed by the NAS layer are disclosed in Sections 5.5.1.2.6, 5.5.3.2.6 and 5.6.1.6 of 3GPP TS 24.301 V9.5.0 (2010-12) "Non-Access-Stratum (NAS) protocol for Evolved Packet System (EPS); Stage 3 (Release 9)," and Sections 4.7.3.1.5, 4.7.5.1.5 and 4.7.13.5 of 3GPP TS 24.008 V9.5.0 (2010-12) "Mobile radio interface Layer 3 specification; Core network protocols; Stage 3 (Release 9)," which are incorporated by reference in their entirety herein. The above-mentioned example regarding the NAS layer can be explained in the context of parameters used in the relevant sections of 3GPP TS 24.301 as follows:

5.5.1.2.6 Abnormal Cases in the UE

1) "CN congestion" indication and "Wait time" from the lower layers

If the value provided by lower layers in the "Wait time" is less than 900 seconds, reset the received value by the lower bound (i.e., 900 seconds)

//example: if received value=300 sec, then reset the value=900 sec

Timer T3446 is started with the value provided by lower layers in the "Wait time" and the state is changed to EMM-DEREGISTERED.ATTEMPTING-TO-ATTACH.

5.5.3.2.6 Abnormal Cases in the UE k) "CN congestion" indication and "Wait time" from the lower layers If the value provided by lower layers in the "Wait time" is less than 900 seconds, reset the received value by the lower bound (i.e., 900 seconds)

//example: if received value=300 sec, then reset the value=900 sec

Timer T3446 is started with the value provided by lower layers in the "Wait time", set the EPS update status to EU2 NOT UPDATED and change to state EMM-REGISTERED.ATTEMPTING-TO-UPDATE.

5.6.1.6 Abnormal Cases in the UE

1) "CN congestion" indication and "Wait time" from the lower layers

The UE shall abort the service request procedure, enter state EMM-REGISTERED, and stop timer T3417 or T3417ext if still running.

If the value provided by lower layers in the "Wait time" is less than 900 seconds, reset the received value by the lower bound (i.e., 900 seconds)

//example: if received value=300 sec, then reset the value=900 sec

The UE shall start timer T3446 with the "Wait time" value provided by the lower layer.

Further, the above-mentioned example regarding the NAS layer can be explained in the context of parameters used in the relevant sections of 3GPP TS 24.008 as follows:

4.7.3.1.5 Abnormal Cases in the MS i) "CN congestion" indication and "Wait time" from the lower layers If the value provided by lower layers in the "Wait time" is less than 900 seconds, reset the received value by the lower bound (i.e., 900 seconds)

//example: if received value=300 sec, then reset the value=900 sec

Timer T3346 is started with the value provided by lower layers in the "Wait time" and the state is changed to GMM-DEREGISTERED.ATTEMPTING-TO-ATTACH.

4.7.5.1.5 Abnormal Cases in the MS i) "CN congestion" indication and "Wait time" from the lower layers If the value provided by lower layers in the "Wait time" is less than 900 seconds, reset the received value by the lower bound (i.e., 900 seconds)

//example: if received value=300 sec, then reset the value=900 sec

Timer T3346 is started with the value provided by lower layers in the "Wait time", set the GPRS update status to GU2 NOT UPDATED and change to state GMM-REGISTERED.ATTEMPTING-TO-UPDATE.

4.7.13.5 Abnormal Cases in the MS h) "CN congestion" indication and "Wait time" from the lower layers If the value provided by lower layers in the "Wait time" is less than 900 seconds, reset the received value by the lower bound (i.e., 900 seconds)

//example: if received value=300 sec, then reset the value=900 sec

The MS shall abort the service request procedure, enter state GMM-REGISTERED, and stop timer T3317 if still running.

The MS shall start timer T3346 with the "Wait time" value provided by the lower layer.

Figure 10:
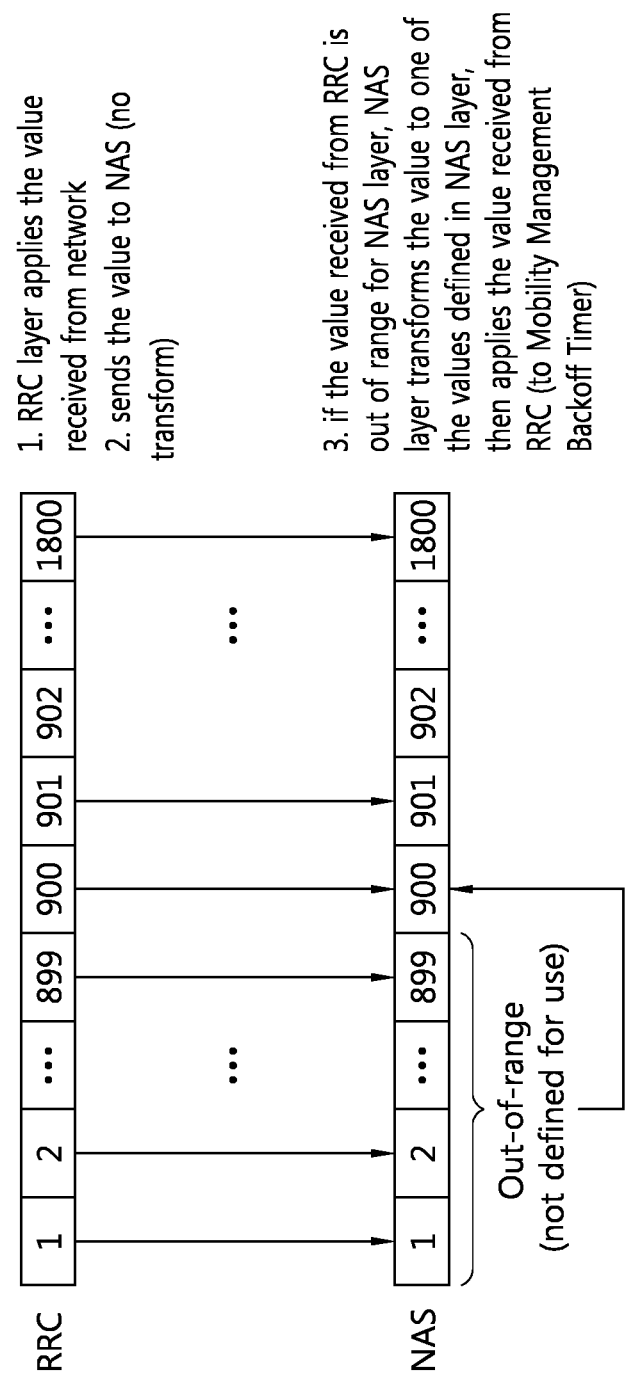
FIG. 10 is a view illustrating a mapping rule for adjusting an original time value.

The above features allow the NAS layer of the UE to adjust an original time value used for the extended wait time to an adjusted time value to be used for the MM back-off timer according to the following mapping rule, which is depicted in FIG. 10. FIG. 10 is a view illustrating a mapping rule for adjusting an original time value. According to FIG. 10, the NAS layer which is served by the RRC layer transforms (or adjusts) the value if the original time value is out of range defined in NAS layer. The transformation or adjustment is performed after the original time value (for the extended wait time) is forwarded to the NAS layer and before the adjusted value is applied to the MM back-off timer.

One of Method 1 and Method 2 can be selected based on a given circumstance. In a case where an RRC value, which is a value used for the RRC layer, is necessary for a single other layer (e.g., NAS layer) only, the work load for each Method is comparable. However, in Method 2, there is no need for the RRC layer to know of other layer's value range.

In a case where the RRC value is necessary for multiple other layers (e.g., NAS and MAC layers) and the multiple other layers have the same range for this value, there is no need for the multiple other layers individually check the validity of range for Method 1. On the other hand, for Method 2, the multiple other layers should check the validity of the range.

In a case where the RRC value is necessary for multiple other layers (e.g., NAS and MAC layers) and the multiple other layers have different ranges for this value, Method 1 is required to adjust the value for multiple cases to the respective multiple layers receiving the value from RRC layer. Then the corresponding number of interfaces is needed (no multicast in the device is possible). On the other hand, for Method 2, the RRC layer can multicast the single value to the multiple layers in the device.

Figure 11:
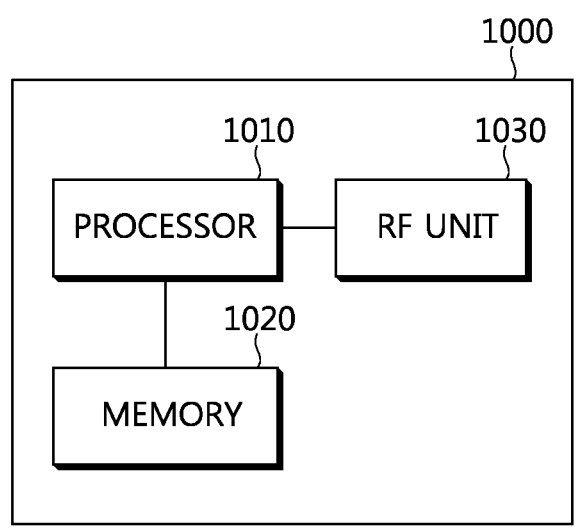
FIG. 11 is a block diagram showing a wireless apparatus to implement technical features of this description.

FIG. 11 is a block diagram showing a wireless apparatus to implement technical features of this description. This may be a part of a UE, an eNodeB/HeNodeB/HNodeB, or a core network (CN) entity. The wireless apparatus 1000 may include a processor 1010, a memory 1020 and a radio frequency (RF) unit 1030.

The processor 1010 may be configured to implement proposed functions, procedures and/or methods described in this description. Layers of the radio interface protocol may be implemented in the processor 1010. The processor 1010 may handle a procedure related radio access congestion control. The memory 1020 is operatively coupled with the processor 1010, and the RF unit 1030 is operatively coupled with the processor 1010.

The processor 1010 may include application-specific integrated circuit (ASIC), other chipset, logic circuit and/or data processing device. The memory 1020 may include read-only memory (ROM), random access memory (RAM), flash memory, memory card, storage medium and/or other storage device. The RF unit 1030 may include baseband circuitry to process radio frequency signals. When the embodiments are implemented in software, the techniques described herein can be implemented with modules (e.g., procedures, functions, and so on) that perform the functions described herein. The modules can be stored in memory 1020 and executed by processor 1010. The memory 1020 can be implemented within the processor 1010 or external to the processor 1010 in which case those can be communicatively coupled to the processor 1010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of communicating data between a radio resource control (RRC) of a user equipment (UE) and a non-access stratum (NAS) of the UE, the method perform by the UE in a wireless communication system using a number of orthogonal frequency division multiplexing (OFDM) symbols and comprising:
   receiving, by the RRC of the UE, an RRC message including a first time value for an extended wait time from a base station;
   adjusting, by the RRC of the UE, the first time value to a second time value when the first time value does not fall within a range of a time value for a mobility management (MM) back-off timer, wherein the second time value falls within the range of the time value for the MM back-off timer; and
   forwarding, by RRC of the UE, the second time value to the NAS of the UE for enabling the NAS of the UE to apply the second time value to the MM back-off timer,
   wherein the first time value ranges from a first lower bound to a first upper bound, and the second time value ranges from a second lower bound to a second upper bound, and wherein the adjustment from the first time value to the second time value is performed based on a predetermined mapping rule.

2. The method of claim 1, wherein the RRC message is one of an RRC connection reject message and an RRC connection release message.

3. The method of claim 1, wherein the UE supports a delay tolerant access or a low priority access.

4. The method of claim 1, further comprising:
   starting an extended wait timer based on the first time value; and
   performing an access class (AC) barring procedure after the extended wait timer is expired.

5. The method of claim 1, wherein the step of adjusting is performed based on a predetermined mapping rule.

6. The method of claim 1, wherein the first upper bound is identical to the second upper bound, and the first lower bound is less than the second lower bound,
   wherein the adjusted second time value is identical to the first time value if the first time value is not less than the second lower bound,
   wherein the first time value is adjusted to be identical to the second lower bound if the first time value is less than the second lower bound.

7. A method of communicating data between a radio resource control (RRC) of a user equipment (UE) and a non-access stratum (NAS) of the UE, the method perform by the UE in a wireless communication system using a number of orthogonal frequency division multiplexing (OFDM) symbols and comprising:
   receiving, by the RRC of the UE, an RRC message including a first time value for an extended wait time from a base station;
   forwarding, by RRC of the UE, the first time value to the NAS of the UE;
   adjusting, by the NAS of the UE, the first time value to a second time value when the first time value does not fall within a range of a time value for a mobility management (MM) back-off timer, wherein the second time value falls within the range of the time value for the MM back-off timer; and
   starting an MM back-off timer according to the second time value,
   wherein the first time value ranges from a first lower bound to a first upper bound, and the second time value ranges from a second lower bound to a second upper bound, and wherein the adjustment from the first time value to the second time value is performed based on a predetermined mapping rule.

8. The method of claim 7, wherein the RRC message is one of an RRC connection reject message and an RRC connection release message.

9. The method of claim 7, wherein the UE supports a delay tolerant access or a low priority access.

10. The method of claim 7, further comprising:
    starting an extended wait timer based on the first time value; and
    performing an access class (AC) barring procedure after the extended wait timer is expired.

11. The method of claim 7, wherein the step of adjusting is performed based on a predetermined mapping rule.

12. The method of claim 7, wherein the first upper bound is identical to the second upper bound, and the first lower bound is less than the second lower bound,
    wherein the adjusted second time value is identical to the first time value if the first time value is not less than the second lower bound,
    wherein the first time value is adjusted to be identical to the second lower bound if the first time value is less than the second lower bound.

13. A user equipment (UE) for communicating data with a base station by using a number of orthogonal frequency division multiplexing (OFDM) symbols, the UE comprising:
    a processor including a radio resource control (RRC) and a non-access stratum (NAS), wherein the RRC is configured for receiving an RRC message including a first time value for an extended wait time from the base station, adjusting the first time value to a second time value when the first time value does not fall within a range of a time value for a mobility management (MM) back-off timer, wherein the second time value falls within the range of the time value for the MM back-off timer, and forwarding the second time value to the NAS for enabling the NAS to apply the second time value to the MM back-off timer, wherein the first time value ranges from a first lower bound to a first upper bound, and the second time value ranges from a second lower bound to a second upper bound, and wherein the adjustment from the first time value to the second time value is performed based on a predetermined mapping rule.

* * * * *